(12) United States Patent
Johansson et al.

(10) Patent No.: US 10,665,404 B2
(45) Date of Patent: May 26, 2020

(54) ELECTRICAL DC SWITCHING SYSTEM

(71) Applicant: ABB Schweiz AG, Baden (CH)

(72) Inventors: Erik Johansson, Västerås (SE); Zichi Zhang, Västerås (SE); Stefan Valdemarsson, Lidköping (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/466,955

(22) PCT Filed: Nov. 22, 2017

(86) PCT No.: PCT/EP2017/080041
§ 371 (c)(1),
(2) Date: Jun. 5, 2019

(87) PCT Pub. No.: WO2018/104054
PCT Pub. Date: Jun. 14, 2018

(65) Prior Publication Data
US 2019/0348238 A1 Nov. 14, 2019

(30) Foreign Application Priority Data
Dec. 5, 2016 (EP) .................................... 16202187

(51) Int. Cl.
*H01H 33/59* (2006.01)
*H01H 33/10* (2006.01)
(Continued)

(52) U.S. Cl.
CPC ............ *H01H 33/596* (2013.01); *H01H 9/36* (2013.01); *H01H 33/10* (2013.01); *H02H 3/16* (2013.01); *H02H 3/087* (2013.01)

(58) Field of Classification Search
CPC .. H01H 9/30; H01H 9/34; H01H 9/36; H01H 9/542; H01H 33/04; H01H 33/10; H01H 33/596; H02H 3/081; H02H 3/087
See application file for complete search history.

(56) References Cited

U.S. PATENT DOCUMENTS

| 4,443,673 A | 4/1984 | Sember |
| 4,458,121 A * | 7/1984 | Yanabu ................ H01H 33/703 218/115 |

(Continued)

FOREIGN PATENT DOCUMENTS

| CH | 521017 A | 3/1972 |
| DE | 2362089 A1 | 6/1975 |

(Continued)

OTHER PUBLICATIONS

Translation of DE2362089. Jun. 26, 1975. (Year: 1975).*
(Continued)

*Primary Examiner* — Thienvu V Tran
*Assistant Examiner* — Christopher J Clark
(74) *Attorney, Agent, or Firm* — Whitmyer IP Group LLC

(57) ABSTRACT

An electrical DC switching system for extinguishing an electric arc, wherein the electrical DC switching system includes: a contact arrangement having a first contact and a second contact, a current injection circuit including a resonance circuit configured to be connected across the contact arrangement, and a first switch connected to the resonance circuit and to the first contact, wherein the first switch is configured to be switched between an open state and a closed state, wherein in the closed state the first switch is configured to enable an injection current to flow through the resonance circuit in a first flow direction and into the contact arrangement in a direction opposite to a flow direction of a contact arrangement arc current, and an arc chute assembly including a plurality of splitter plates configured to extinguish an electric arc across the first contact and the second contact, wherein each splitter plate of the plurality of splitter plates has a layered configuration including a magnetic layer and two non-magnetic layers.

20 Claims, 3 Drawing Sheets

(51) Int. Cl.
    *H01H 9/36*     (2006.01)
    *H02H 3/16*     (2006.01)
    *H02H 3/087*     (2006.01)

(56) References Cited

U.S. PATENT DOCUMENTS

| | | | |
|---|---|---|---|
| 4,485,283 | A | 11/1984 | Hurtle |
| 5,402,297 | A * | 3/1995 | Ouchi ................ H01H 33/596 361/1 |
| 5,866,864 | A | 2/1999 | Mody et al. |
| 10,002,722 | B2 * | 6/2018 | Backman ................ H02H 3/08 |
| 2013/0075367 | A1 * | 3/2013 | Eriksson ................ H01H 9/40 218/34 |
| 2015/0029617 | A1 * | 1/2015 | Abplanalp ............. H01H 33/08 361/2 |

FOREIGN PATENT DOCUMENTS

| | | |
|---|---|---|
| DE | 3044153 A1 | 6/1982 |
| DE | 69618105 T2 | 7/2002 |
| EP | 0092207 A2 | 10/1983 |
| RU | 2451360 C1 | 5/2012 |
| RU | 2010151662 A | 6/2012 |
| SU | 586510 A1 | 12/1977 |
| WO | 2012076603 A1 | 6/2012 |
| WO | 2013152799 A1 | 10/2013 |
| WO | 2016131949 A1 | 8/2016 |

OTHER PUBLICATIONS

Russian Search Report Translation Application No. 2019120686/07 (040419) Completed: Dec. 12, 2019 2 Pages.
Adil Erk et al: "Anwendungen des Wechslstrom-Löschprinzip bei Gleichstromausschaltung", Grundlagen Der Schaltgerätetechnik, Dec. 31, 1975: XP055371240 4 Pages.
European Search Report Application No. EP 16 20 2187 Completed: May 11, 2017;dated May 23, 2017 8 pages.
International Search Report and Written Opinion of the International Searching Authority Application No. PCT/EP2017/080041 Completed: Jan. 26, 2018; dated Feb. 5, 2018 17 pages.

* cited by examiner

ELECTRICAL DC SWITCHING SYSTEM

TECHNICAL FIELD

The present disclosure generally relates to an electrical DC switching system for extinguishing an electric arc. In particular, it relates to an electrical DC switching system of a type that relies on artificial zero-crossings for arc extinguishing purposes.

BACKGROUND

Switching systems are used for interrupting a current or protecting an electric circuit in the event of an electrical failure, for example, due to a short circuit. Switching systems may comprise contacts which during normal operation are in mechanical connection. When the contacts are separated from each other a current breaking operation is effected. In addition to separating the contacts, a current breaking operation involves extinguishing an arc between the contacts, and to force the current to zero.

Alternating current (AC) switching systems utilize the naturally occurring zero-crossings of the alternating current flowing through the switching system for extinguishing the arc.

Direct current (DC) switching systems cannot utilize natural zero-crossings since there are none. It is known to create artificial zero-crossings for DC switching systems in order to be able to perform a current breaking operation. One way to obtain an artificial zero-crossing is by utilizing a resonance circuit connected across the contacts. The resonance circuit comprises a capacitor which is continually charged by an energy source. The capacitor is charged to obtain a polarity which enables a capacitor discharge current to flow through the contacts in the opposite direction relative to the arc current flowing through the arc. The arrangement furthermore comprises a switch which normally is in its open state. When a current breaking operation is effected and the contacts are separated, the switch is closed, wherein the capacitor discharges its electric charge and the resonance circuit provides a current pulse into the contacts. The current pulse flows in the opposite direction relative to the arc current. By selecting suitable values of the capacitor and inductance in the resonance circuit, an artificial zero-crossing is obtained. At this time the arc generated at the contacts, which enables the arc current to continue to flow after opening of the separation of the contacts, may be extinguished by deionization of the hot plasma and/or gas in the gap between the contacts. In this manner it is possible to break the arc current.

The above-described artificial zero-crossing creation requires that the capacitor is charged at all times. Furthermore a power supply is needed to constantly charge the capacitor. Moreover, the artificial zero-crossing provides for only a single chance to successfully extinguish the arc and thus to break the arc current.

WO 2016/131949 A1 discloses a switching system for breaking a current which allows for several opportunities to successfully extinguish the arc and thus to break the arc current, by providing several subsequent artificial zero-crossings utilizing a resonance circuit and switches to use the arc current repeatedly inject a reverse current into the contact arrangement.

SUMMARY

In conventional DC switching systems for breaking a current, the arc travels across the splitter plates with a voltage between each splitter plate that may be in the order of about a hundredth of the DC voltage source. These voltages sum up to a reverse voltage of the same magnitude as that provided by the DC voltage source which feeds the contacts. Hence, in the order of a hundred of such splitter plates are necessary to obtain a reverse voltage equal to that of the DC voltage source. The current can in this manner relatively slowly be decreased from the arc current value to zero.

In DC switching systems of the type that inject a current in the reverse direction compared to the arc current, the current flowing through the contact arrangement will relatively quickly become zero. As a result, a very quick build-up of a reverse voltage equaling the DC voltage source level is obtained across the splitter plates once an artificial zero-crossing has been created.

Hence, according to the conventional approach a reverse voltage is built up across the splitter plates to thereby obtain a current reduction, relatively slowly reducing the current to zero after the reverse voltage has built up to the level of the DC voltage source. According to the conventional approach, a great plurality of splitter plates is needed to build up the required voltage level. As previously noted the number of splitter plates required may, for example, be in the order of a hundred. The current injection approach on the other hand sets the current to zero by injecting a current in the reverse direction, and when the current is zero the reverse voltage across the splitter plates builds up to the magnitude of the voltage of the DC voltage source. The arc extinguishing principle of the current injection approach may hence be seen as the opposite to that of the conventional approach. In particular, according to the current injection method the splitter plates are only used as a means of deionizing the post arc gas and not, as in the conventional case, as a reverse voltage source which sums up to a reverse voltage of the same magnitude as that provided by the DC voltage source which feeds the contacts. This means that there is no need to build up the reverse voltage from the sum of arc voltages between, for example, a hundred splitter plates in order to create a zero-crossing. In the herein presented novel arc extinguishing principle the number of splitter plates needed is only governed by the withstand ability of the post arc gaps and would in this same example only be about ten.

In other words, since by means of current injection methods the reverse voltage is essentially attained as a result of the current reaching zero, the number of splitter plates need not be chosen so large as for the conventional case and hence the potential difference between each adjacent splitter plate is permitted to reach much higher voltage levels than in the conventional case. The potential difference between adjacent splitter plates could in particular be in the order of ten higher than in the conventional case. This means that the number of splitter plates could be reduced with about 90% in the current injection case.

DE 2362089 discloses a type of electric arc quenching plate that consists of a brass-plated sheet of iron or steel. The steel is plated with brass on both sides.

The present inventors, having realized the aforementioned considerations, have thus surprisingly become aware of that splitter plates with a certain layered material configuration, for example, as disclosed in DE 2362089, in combination with a DC switching system based on the DC current injection principle provides a highly synergistic effect compared to when such splitter plates are used with conventional DC switching systems. This enables the reduction of the number of splitter plates by about 90%, thereby significantly reducing the footprint and material cost of a DC switching system.

In view of the above, an object of the present disclosure is to provide an electrical DC switching system which solves, or at least mitigate, the problems of the prior art.

There is hence provided an electrical DC switching system for extinguishing an electric arc, wherein the electrical DC switching system comprises: a contact arrangement having a first contact and a second contact, a current injection circuit including a resonance circuit configured to be connected across the contact arrangement, and a first switch connected to the resonance circuit and to the first contact, wherein the first switch is configured to be switched between an open state and a closed state, wherein in the closed state the first switch is configured to enable an injection current to flow through the resonance circuit in a first flow direction and into the contact arrangement in a direction opposite to a flow direction of a contact arrangement arc current, and an arc chute assembly comprising a plurality of splitter plates configured to extinguish an electric arc across the first contact and the second contact, wherein each splitter plate of the plurality of splitter plates has a layered configuration comprising a magnetic layer and two non-magnetic layers.

One advantage with being able to use fewer splitter plates is that the total energy created inside the DC switching system is a small fraction (<one tenth) compared to the conventional method. Hence the problem of taking care of the hot gas and the arcing energy is considerably reduced.

Another advantage is that the withstand voltage between adjacent splitter plates immediately after current zero is considerably higher than the arcing voltage, typically ten times, if non-magnetic material is used in the splitter plates. Hence the number of splitter plates can be reduced to only about one tenth because the sum of the arcing voltages is of no interest as for the conventional approach.

A third advantage is that the arcing time is considerably reduced preventing severe melting in the splitter plate surfaces and hence short circuiting in between. This will reduce the total heating furthermore and the risk of arc re-ignition inside and outside the arc chute assembly. The arcing time reduction is in the order of five to ten times and is a consequence of a relative high frequency of the resonance circuit used for the injection current.

According to one embodiment for each splitter plate the magnetic layer is surrounded by the two non-magnetic layers.

According to one embodiment for each splitter plate the magnetic layer is a magnetic sheet and the two non-magnetic layers are two non-magnetic sheets and wherein the magnetic sheet and the non-magnetic sheets are arranged in a detachable stacked manner.

According to one embodiment for each splitter plate the magnetic layer and the two non-magnetic layers are cladded.

According to one embodiment for each splitter plate the two non-magnetic layers are coatings provided on the magnetic layer.

According to one embodiment for each splitter plate the magnetic layer is a steel layer or an iron layer.

According to one embodiment for each splitter plate each of the two non-magnetic layers is a brass layer.

According to one embodiment the resonance circuit comprises a capacitor and an inductor.

According to one embodiment the current injection circuit comprises a DC power source configured to charge the capacitor when the first switch is in the open position. The DC power source is in particular configured to charge the capacitor such that the injection current flowing through the resonance circuit and into the contact arrangement when the first switch is set in the closed state is in the reverse direction in relation to the contact arrangement arc current.

One embodiment comprises a control system, wherein the current injection circuit comprises a second switch connected to the resonance circuit and to the second contact of the contact arrangement, wherein the second switch is configured to be switched between an open state and a closed state, wherein in the closed state the second switch is configured to enable current to flow through the resonance circuit in a second flow direction opposite to the first flow direction, and a control system, wherein the control system is configured to alternatingly first set the first switch, and then the second switch, first in the closed state and then in the open state upon a current breaking operation, until a current pulse, emanating from energy supplied by the contact arrangement arc current, flowing through the resonance circuit and into the contact arrangement, and thereafter into the splitter plates reaches an amplitude which is equal to or greater than a magnitude of the contact arrangement arc current.

According to one embodiment in each iteration of alternatingly first setting the first switch, and then the second switch, first in the closed state and then in the open state, the control system is configured to: set the first switch in the closed position, enabling a first current pulse to flow through the resonance circuit in the first flow direction, set first the first switch in the open state and then the second switch in the closed state when the first current pulse has become zero to enable a second current pulse to flow through the resonance circuit in the second flow direction, and to set the second switch in the open state when the second current pulse first has become zero.

According to one embodiment the second switch is connected across the resonance circuit.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

A number of variations of an electrical DC switching system for breaking a current will be described herein. The electrical DC switching system comprises a contact arrangement having a movable breaker contact and a fixed contact. The breaker contact can be actuated between a closed position in which it is in mechanical contact with the fixed contact and an open position in which the breaker contact is mechanically separated from the fixed contact. The movable breaker contact defines a first contact of the contact arrangement and the fixed contact defines a second contact of the contact arrangement.

The electrical DC switching system comprises a current injection circuit including a resonance circuit, which is an LC-circuit comprising a capacitor and an inductor, and a first switch. The inductor may either be an inductor component or the inherent inductance of the conductors to which the capacitor is connected.

The resonance circuit is configured to be connected across the contact arrangement. The first switch is configured to be switched between a closed state and an open state. When in the closed state, an injection current is able to flow through the resonance circuit and into the contact arrangement in a direction opposite to a flow direction of a contact arrangement arc current. The current injection circuit is, via the resonance circuit, configured to inject an injection current with an amplitude which is equal to or greater than a magnitude of the contact arrangement arc current.

The electrical DC switching system also includes an arc chute assembly comprising a plurality of splitter plates configured to extinguish an arc across the contact arrangement. Each splitter plate of the plurality of splitter plates has a layered configuration comprising a magnetic layer and two non-magnetic layers. The arc chute assembly is arranged in the proximity of the contact arrangement so that at the instance of arc extinction, i.e., when the artificial zero-crossing is attained, the injection current provided by the current injection circuit will flow into the splitter plates in an opposite direction to the flow direction of the contact arrangement arc current.

Figure 1:
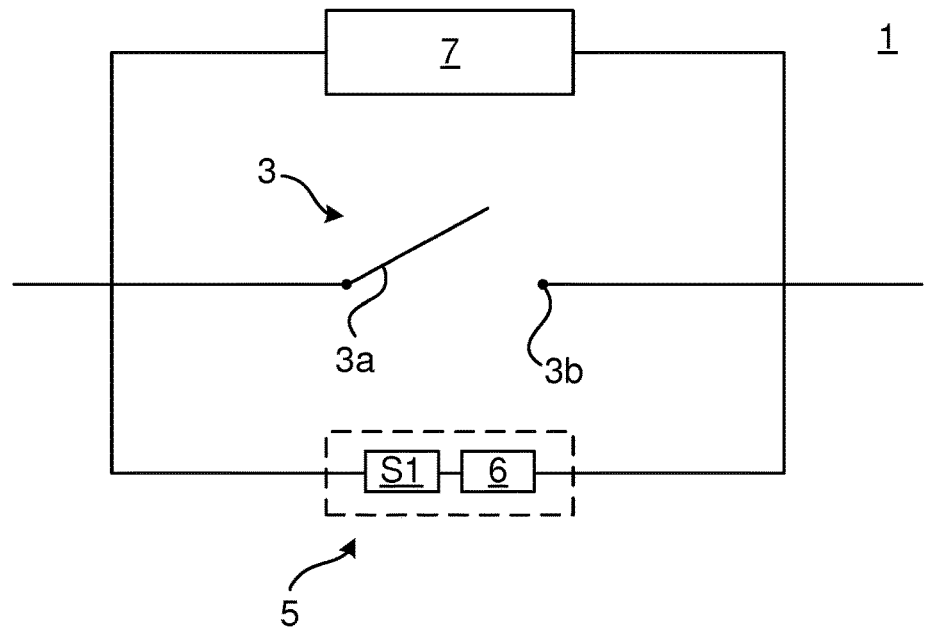
FIG. 1 shows an example of an electrical DC switching system for breaking a current.

FIG. 1 shows a general example of an electrical DC switching system 1 for breaking a current and to extinguish an electric arc. DC switching system 1 comprises a contact arrangement 3 having a first contact 3a and a second contact 3b. The first contact 3a may be a movable breaker contact and the second contact 3b may be a fixed contact. The contact arrangement 3 may be set in an open state by moving the breaker contact away from the fixed contact, and in a closed state in which the breaker contact is in mechanical contact with the fixed contact.

The electrical DC switching system 1 also includes a current injection circuit 5 including a resonance circuit 6 connected across the contact arrangement 3, in particular across the first contact 3a and the second contact 3b, and a first switch S1. The resonance circuit 6 includes a capacitor and an inductor or alternatively the inductor comprises the inductance of the circuit path of the injection current, forming an LC-circuit.

The electrical DC switching system 1 further includes an arc chute assembly 7 configured to extinguish an arc across the contact arrangement. The arc chute assembly 7 comprises a plurality of splitter plates. Each of the plurality of splitter plates has a layered configuration comprising three layers, namely a magnetic layer, and two non-magnetic layers. All of the splitter plates of the arc chute assembly 7 may according to one variation have the layered configuration. According to another variation only some of the splitter plates of the arc chute assembly may have the layered configuration.

The magnetic material may, for example, be iron or steel. The non-magnetic material may, for example, be brass, zinc, copper, silver, gold, magnesium, or various alloys of the aforementioned materials.

Figure 2:
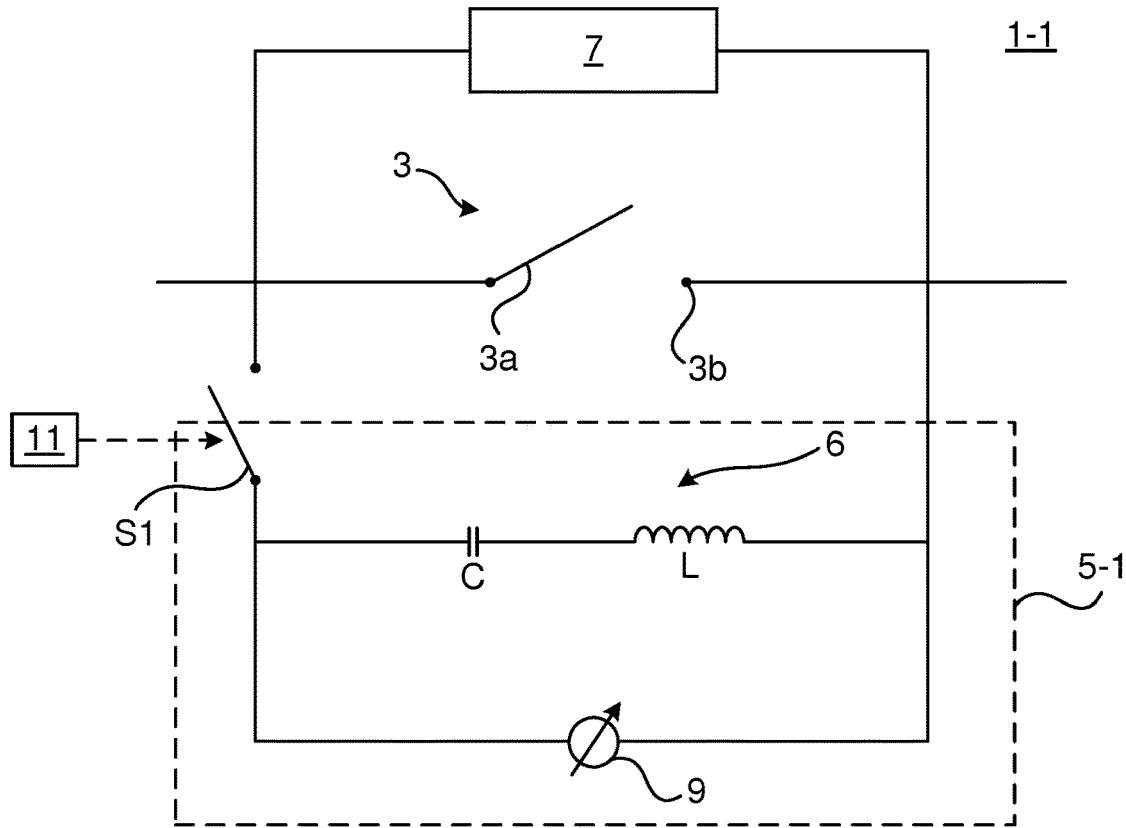
FIG. 2 shows the electrical DC switching system in FIG. 1 with a first implementation of a current injection circuit.

FIG. 2 shows an example of an electrical DC switching system 1-1 including a control system 11 configured to control the first switch S1. The resonance circuit 6 includes a capacitor C and an inductor L, alternatively the circuit inductance, and the exemplified current injection circuit 5-1 further includes a DC power source 9 configured to charge the capacitor C to obtain a voltage with reverse polarity relative to that of the power source (not shown) feeding the contact arrangement 3. The DC power source 9 is configured to maintain the capacitor C in a charged state when the first switch S1 is in the open state. In the event of a circuit breaking operation, when the first contact 3a is moved away from the second contact 3b, the control system 11 is configured to set the first switch S1 in the closed state, whereby a reverse current is injected into the contact arrangement 3, and thereafter into the splitter plates 7a-7c. An artificial zero-crossing can thus be created inside the splitter plates.

Figure 3:
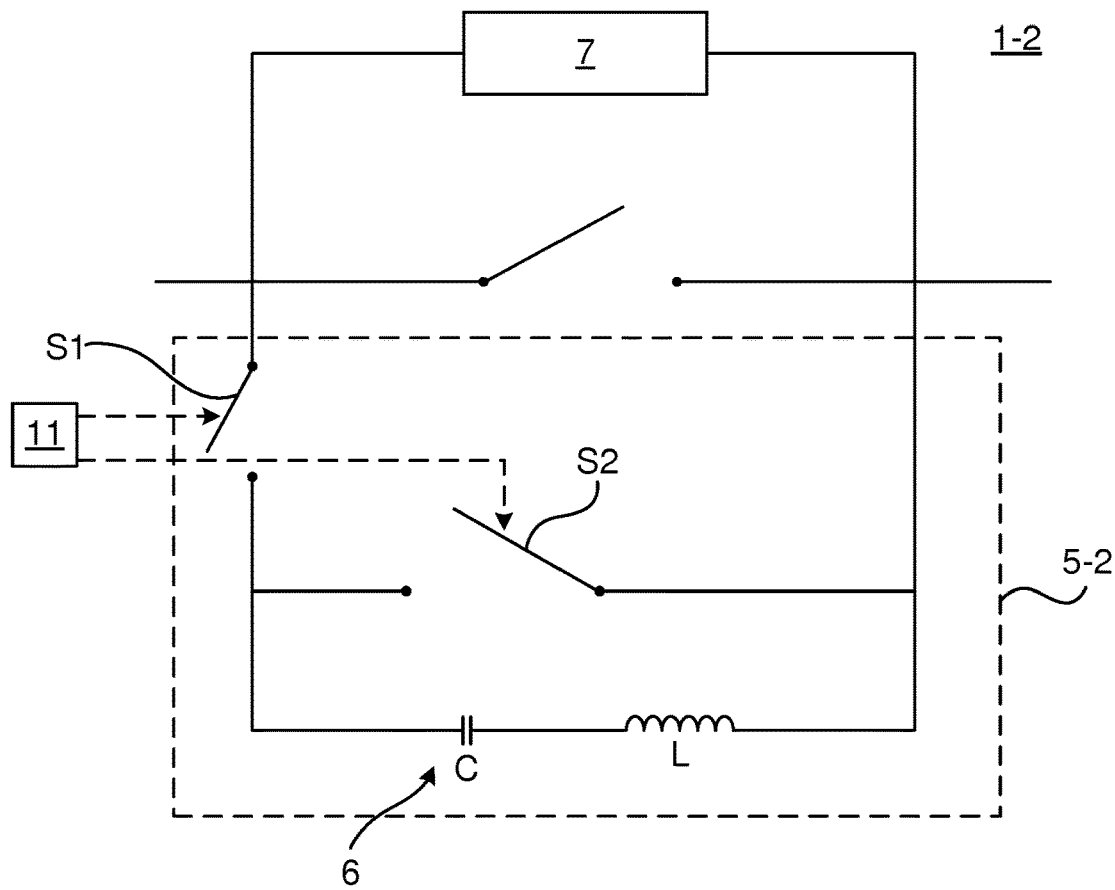
FIG. 3 shows the electrical DC switching system in FIG. 1 with a second example of a current injection circuit.

Another example of an electrical DC switching system is shown in FIG. 3. According to the example in FIG. 3, electrical DC switching system 1-2 comprises a control system 11 and a current injection circuit 5-2 comprising the resonance circuit 6, including the capacitor C and the inductor L, or alternatively the circuit inductance, the first switch S1 and a second switch S2.

The resonance circuit 6 is configured to be connected across the contact arrangement 3. The resonance circuit 6 is in particular configured to be connected across the contact arrangement 3 by means of the first switch S1 and by means of the second switch S2. The first switch S1 is configured to be switched between an open state and a closed state. The first switch S1 is connected to the first contact 3a of the electrical DC switching system 1-2 and to the resonance circuit 6. The first switch S1 is connected in such a way that in the closed state it enables a current pulse emanating from energy supplied by the contact arrangement arc current to flow in a first flow direction through the resonance circuit 6. It furthermore enables the current to flow into the contact arrangement in a direction opposite to the contact arrangement arc current flow direction which flows through the contact arrangement via the arc.

The second switch S2 is configured to be switched between an open state and a closed state. The second switch S2 is connected to the second contact 3b of the switching system 1 and to the resonance circuit 6. In particular, the second switch S2 is connected across the resonance circuit 6.

The control system 11 is configured to alternatingly switch first the first switch S1 between its open state and closed state and then to switch the second switch S2 between its open state and closed state. The control system 11 is configured to be triggered to control the first switch S1 and the second switch S2 by energy supplied by the contact arrangement arc current. The control system 11 is configured to alternatingly switch first the first switch S1 between its open state and closed state and then to switch the second switch S2 between its open state and closed state until a current pulse, emanating from energy supplied by the contact arrangement arc current, flowing through the resonance circuit 6 and into the contact arrangement via the first switch S1 has an amplitude which is equal to or preferably larger than the contact arrangement arc current flowing through the contact arrangement 3. At the time when the current pulse has an amplitude that equals the magnitude of the contact arrangement arc current, an artificial zero-crossing is created inside the splitter plates 7a-7c, facilitating the extinguishing of the arc.

The first switch S1, the second switch S2 and the resonance circuit 6 form a pumping circuit, which is configured to inject a current pulse with higher and higher amplitude for each repetition, i.e., for each iteration of alternatingly first set the first switch, and then the second switch, first in the closed state and then in the open state. Depending on the number of switches, and their connection to the resonance circuit, a half-wave pumping circuit, as exemplified above, or a full-wave pumping circuit, as disclosed in WO 2016/131949 A1 may be obtained.

The first switch S1 and the second switch S2 may, for example, be semiconductor switches such as thyristors or transistors. The control system 11 according to any example provided herein may, for example, comprise gate drive units for semiconductor switches.

Figure 4:
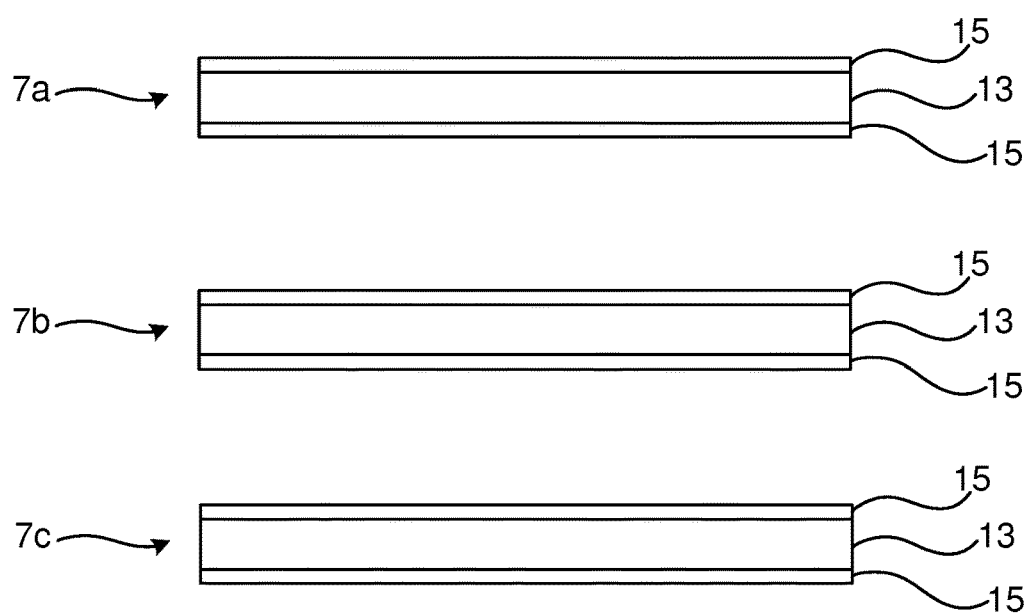
FIG. 4 shows a side view of a number of splitter plates of an arc chute assembly.

Turning now to FIG. 4, an example of an arc chute assembly 7 of any of the electrical DC switching systems 1, 1-1 and 1-2, will now be described in more detail.

Arc chute assembly 7 comprises a plurality of splitter plates 7a-7c arranged in a stacked spaced-apart relationship. It is to be noted that although only three splitter plates are shown in the example in FIG. 3, it should be understood that the arc chute assembly may comprise more than three splitter plates, or even fewer splitter plates.

Each splitter plate 7a-7c of the plurality of splitter plates 7a-7c has a layered configuration. In particular, each splitter plate 7a-7c has a magnetic layer 13 and two non-magnetic layers 15. In a typical example, the non-magnetic layers 15 surround the magnetic layer 13. Hence, the layers 15 and 13 may be arranged in a sandwiched configuration with the magnetic layer 13 arranged in between the two non-magnetic layers 15.

The two non-magnetic layers 15 may, for example, be a coating provided on the magnetic layer 13. Alternatively, the two non-magnetic layers 15 and the magnetic layer 13 may be three separate plates or sheets having been jointed in a cladding process. According to yet another example, the two non-magnetic layers 15 and the magnetic layer 13 of each splitter plate 7a-7c may be three different sheets, namely two non-magnetic sheets and one magnetic sheet, arranged in a stacked formation or configuration in a detachable manner. In this latter case, there is no cladding, coating or adhesive process to form the splitter plates; for each splitter plate 7a-7c, the non-magnetic sheets and the magnetic sheet may in this case be mounted tightly to each other, for example, by means of fasteners such as screws.

Figure 5A:
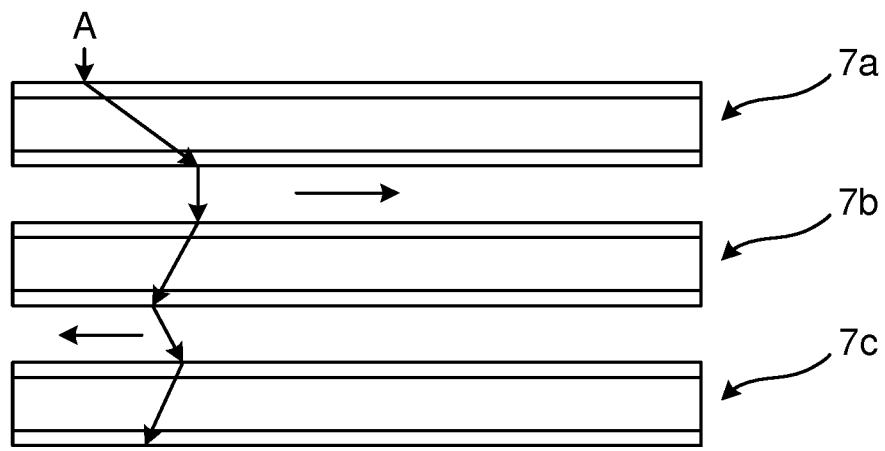
FIGS. 5a and 5b show two examples of splitter plates in use.

FIG. 5a shows an example of how the electric arc A may travel through the splitter plates 7a-7c in case the non-magnetic layers 15 and the magnetic layer 13 of the splitter plates 7a-7c have been joined, or in the event of coating. Due to the repulsion of the arc at each level of the arc chute assembly 7 formed by the splitter plates 7a-7c, the blowing force may be directed in different direction, i.e., in which the arc moves in a plane parallel with the splitter plates 7a-7c as shown by the arrows, because the arc may travel through the splitter plates 7a-7c randomly.

Figure 5B:
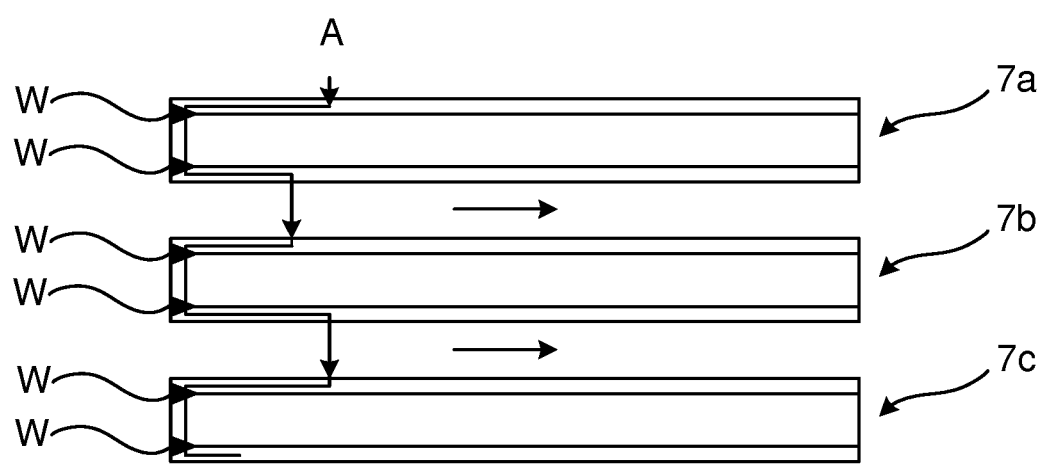

FIG. 5b shows an example of how the electric arc A may travel through the splitter plates 7a-7c in case the non-magnetic layers 15 and the magnetic layer 13 have not been joined or coated, i.e., if they are stacked in a detachable manner with a tight mounting between them. In this case, the non-magnetic sheets and the magnetic sheet are welded together in portions of the splitter plates 7a-7c closest to where the arc enters the arc chute assembly 7. This welding occurs initially when the arc enters the arc chute assembly 1, as indicated by references w, due to the heat. Because of these welds, the arc A will move in a more controlled manner through the splitter plates 7a-7c, in particular through the welds as indicated in FIG. 5b. In this manner the blowing force will always be directed in the same direction. Since the direction can be controlled, the dimensioning of the splitter plates 7a-7c may in the design stage be optimized based on the known direction in which the arc will move due to the blowing force.

The electrical DC switching systems presented herein may, for example, be a circuit breaker, a contactor, or a current limiter, and may be utilized in DC applications, for example, in low voltage (LV) applications or medium voltage (MV) applications.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. An electrical DC switching system for extinguishing an electric arc, wherein the electrical DC switching system comprises:
    a contact arrangement having a first contact and a second contact,
    a current injection circuit including a resonance circuit configured to be connected across the contact arrangement, and a first switch connected to the resonance circuit and to the first contact, wherein the first switch is configured to be switched between an open state and a closed state, wherein in the closed state the first switch is configured to enable an injection current to flow through the resonance circuit in a first flow direction and into the contact arrangement in a direction opposite to a flow direction of a contact arrangement arc current, and
    an arc chute assembly including a plurality of splitter plates configured to extinguish an electric arc across the first contact and the second contact, wherein each splitter plate of the plurality of splitter plates has a layered configuration including a magnetic layer and two non-magnetic layers.

2. The electrical DC switching system as claimed in claim 1, wherein for each splitter plate the magnetic layer is surrounded by the two non-magnetic layers.

3. The electrical DC switching system as claimed in claim 1, wherein for each splitter plate the magnetic layer is a magnetic sheet and the two non-magnetic layers are two non-magnetic sheets and wherein the magnetic sheet and the non-magnetic sheet are arranged in a detachable stacked manner.

4. The electrical DC switching system as claimed in claim 1, wherein for each splitter plate the magnetic layer and the two non-magnetic layers are cladded.

5. The electrical DC switching system as claimed in claim 1, wherein for each splitter plate the two non-magnetic layer are coatings provided on the magnetic layer.

6. The electrical DC switching system as claimed in claim 1, wherein for each splitter plate the magnetic layer is a steel layer or an iron layer.

7. The electrical DC switching system as claimed in claim 1, wherein for each splitter plate each of the two non-magnetic layers is a brass layer.

8. The electrical DC switching system as claimed in claim 1, wherein the resonance circuit includes a capacitor and an inductor.

9. The electrical DC switching system as claimed in claim 8, wherein the current injection circuit includes a DC power source configured to charge the capacitor when the first switch is in the open position.

10. The electrical DC switching system as claimed in claim 1, comprising:
a control system,
wherein the current injection circuit includes a second switch connected to the resonance circuit and to the second contact of the contact arrangement, wherein the second switch is configured to be switched between an open state and a closed state, wherein in the closed state the second switch is configured to enable current to flow through the resonance circuit in a second flow direction opposite to the first flow direction, and
wherein the control system is configured to alternatingly first set the first switch, and then the second switch, first in the closed state and then in the open state upon a current breaking operation, until a current pulse, emanating from energy supplied by the contact arrangement arc current, flowing through the resonance circuit and into the contact arrangement reaches an amplitude which is equal to or greater than a magnitude of the contact arrangement arc current.

11. The electrical DC switching system as claimed in claim 10, wherein in each iteration of alternatingly first setting the first switch, and then the second switch, first in the closed state and then in the open state, the control systems is configured to:
set the first switch in the closed position, enabling a first current pulse to flow through the resonance circuit in the first flow direction,
set first the first switch in the open state and then the second switch in the closed state when the first current pulse has become zero to enable a second current pulse to flow through the resonance circuit in the second flow direction, and
to set the second switch in the open state when the second current pulse first has become zero.

12. The electrical DC switching system as claimed in claim 10, wherein the second switch is connected across the resonance circuit.

13. The electrical DC switching system as claimed in claim 2, wherein for each splitter plate the magnetic layer is a magnetic sheet and the two non-magnetic layers are two non-magnetic sheets and wherein the magnetic sheet and the non-magnetic sheet are arranged in a detachable stacked manner.

14. The electrical DC switching system as claimed in claim 2, wherein for each splitter plate the magnetic layer and the two non-magnetic layers are cladded.

15. The electrical DC switching system as claimed in claim 2, wherein for each splitter plate the two non-magnetic layers are coatings provided on the magnetic layer.

16. The electrical DC switching system as claimed in claim 2, wherein for each splitter plate the magnetic layer is a steel layer or an iron layer.

17. The electrical DC switching system as claimed in claim 2, wherein for each splitter plate each of the two non-magnetic layers is a brass layer.

18. The electrical DC switching system as claimed in claim 2, wherein the resonance circuit includes a capacitor and an inductor.

19. The electrical DC switching system as claimed in claim 8, comprising:
a control system,
wherein the current injection circuit includes a second switch connected to the resonance circuit and to the second contact of the contact arrangement, wherein the second switch is configured to be switched between an open state and a closed state, wherein in the closed state the second switch is configured to enable current to flow through the resonance circuit in a second flow direction opposite to the first flow direction, and
wherein the control system is configured to alternatingly first set the first switch, and then the second switch, first in the closed state and then in the open state upon a current breaking operation, until a current pulse, emanating from energy supplied by the contact arrangement arc current, flowing through the resonance circuit and into the contact arrangement reaches an amplitude which is equal to or greater than a magnitude of the contact arrangement arc current.

20. The electrical DC switching system as claimed in claim 11, wherein the second switch is connected across the resonance circuit.

* * * * *